(12) United States Patent
Takada et al.

(10) Patent No.: US 6,394,079 B2
(45) Date of Patent: May 28, 2002

(54) GAS-LIQUID SEPARATION DEVICE FOR INTERNAL COMBUSTION ENGINE USED IN OUTBOARD MOTOR

(75) Inventors: Hideaki Takada; Hiroki Tawa; Yoshihiko Fukuda, all of Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/800,637

(22) Filed: Mar. 6, 2001

(30) Foreign Application Priority Data

Mar. 31, 2000 (JP) ........................................ 2000-097460

(51) Int. Cl.[7] ........................ F01M 13/00; B63H 20/00
(52) U.S. Cl. ........................................ 123/572; 123/573
(58) Field of Search ................................ 123/572, 573, 123/574

(56) References Cited

U.S. PATENT DOCUMENTS

| | | | |
|---|---|---|---|
| 4,607,604 A | * | 8/1986 | Kanoh et al. ................. 123/572 |
| 4,922,881 A | * | 5/1990 | Tamba et al. ................. 123/572 |
| 5,474,035 A | | 12/1995 | Ming et al. ................... 123/41.86 |
| 5,957,118 A | * | 9/1999 | Tateno et al. ................. 123/573 |
| 6,003,501 A | * | 12/1999 | Shimazaki et al. ........... 123/572 |
| 6,237,577 B1 | * | 5/2001 | Takahashi et al. ............. 123/572 |

FOREIGN PATENT DOCUMENTS

JP 8-21226 1/1996

* cited by examiner

*Primary Examiner*—Marguerite McMahon

(57) ABSTRACT

In a gas-liquid separation device for an internal combustion engine used in an outboard motor, comprising: a gas-liquid separation chamber defined in a part of the engine, the chamber being provided with first and second ports communicating with a crankcase, and a third port communicating with an intake passage, the first port is provided with a first one-way valve for allowing blow-by gas from the crankcase to flow into the chamber, and the second port is provided with a second one-way valve for allowing oil separated from the blow-by gas to be discharged from the chamber, wherein the second one-way valve includes a reed valve member adapted to selectively close the second port, and a valve seat defined by an annular surface which is elevated from a surface of a wall surrounding the second port and defines a larger opening area than the second port.

7 Claims, 4 Drawing Sheets

GAS-LIQUID SEPARATION DEVICE FOR INTERNAL COMBUSTION ENGINE USED IN OUTBOARD MOTOR

TECHNICAL FIELD

The present invention relates to a gas-liquid separation device of an internal combustion engine, and more particularly relates to a gas-liquid separation device disposed in a blow-by gas return passage of an internal combustion engine used in outboard motors.

BACKGROUND OF THE INVENTION

In four cycle internal combustion engines used in outboard motors (or outboard marine engines), it has been known to provide a bore in the cylinder head and cylinder block to form a crankcase ventilation passage (or breather passage) for bringing the crankcase into flow communication with the valve operating cam chamber defined in the cylinder head to thereby control the pressure pulsation in the crankcase caused by reciprocating movements of the pistons. In such a configuration, the gases passing through the gap between the piston ring and the cylinder wall into the crankcase (i.e., blow-by gases) are circulated back to the intake passage via the crankcase ventilation passage and the valve operating cam chamber due to the negative pressure produced in the intake passage so that the blow-by gases, which may contain unburned components, are not emitted into the atmosphere.

Also, a gas-liquid separation chamber is preferably defined in the cylinder head cover or the like between the intake passage and the valve operating cam chamber in order to prevent the oil mist contained in the blow-by gases from mixing with the intake air. The blow-by gases entrained with the oil mist enter the gas-liquid separation chamber through an inlet port, and as the blow-by gases flow through a tortuous passage defined in the gas-liquid separation chamber, the oil contained in the blow-by gases is liquefied and separated from the gases. The separated oil is discharged from the gas-liquid separation chamber through an outlet port back to the valve operating cam chamber (see for example Japanese Patent Application Laid-Open (Kokai) No. 8-21226).

The inlet and outlet ports may be preferably provided with reed valve members to form one-way valves that open and close in response to a pressure difference between the valve operating cam chamber (or crankcase) and the gas-liquid separation chamber (or intake passage).

In such a gas-liquid separation device comprising the reed valves, however, when the reed valve member associated with the outlet port operates to abut a wall surface around the outlet port to close the same, the reed valve member tends to force the lubricating oil that has accumulated in an inside of the outlet port back into the gas-liquid separation chamber. Such a "pumping effect" caused by the valve-closing action of the reed valve member can undesirably decrease the return efficiency of the separated lubricating oil to the valve operating cam chamber.

BRIEF SUMMARY OF THE INVENTION

In view of such problems of the prior art and the recognition by the inventors, a primary object of the present invention is to provide an improved gas-liquid separation device for an internal combustion engine that can ensure a smooth discharge of the liquefied lubricating oil from the gas-liquid separation chamber.

A second object of the present invention is to provide such an improved gas-liquid separation device suitable for an internal combustion engine used in an outboard motor.

A third object of the present invention is to provide such an improved gas-liquid separation device without a substantial increase in the number of component parts and manufacturing cost.

According to the present invention, these and other objects can be accomplished by providing a gas-liquid separation device for an internal combustion engine, comprising: a gas-liquid separation chamber defined in a part of the engine, the chamber being provided with first and second ports communicating with a crankcase, and a third port communicating with an intake passage, the first port being provided with a first one-way valve for allowing blow-by gas from the crankcase to flow into the chamber, and the second port being provided with a second one-way valve for allowing oil separated from the blow-by gas to be discharged from the chamber, wherein the second one-way valve includes a reed valve member adapted to selectively close the second port, and a valve seat defined by an annular surface which is elevated from a surface of a wall surrounding the second port and defines a larger opening area than the second port.

In this way, due to the elevated valve seat having a larger opening area than the second (oil discharge) port, a space having a certain volume is defined in the valve-closing state between the reed valve member and the wall surface around the second port. This space effectively serves to dampen or reduce the "pumping effect" caused by the closing action of the reed valve, thus preventing the oil accumulated in the second port from being pushed back to the inside of the gas-liquid separation chamber to thereby ensure a smooth discharge of the separated lubricating oil from the gas-liquid separation chamber.

In a preferred embodiment, said annular surface comprises a free end of an annular protrusion extending out from the wall surface surrounding the second port. Such a configuration may be preferable in view of easily providing the elevated annular surface serving as a valve seat. It will be further preferable if the wall comprises an elevated surface substantially aligned with the valve seat, and a base portion of the reed valve member is secured to the elevated surface. This can ensure a preferable contact between the reed valve member and the valve seat.

Typically, the internal combustion engine comprises: a cylinder head defining therein a valve operating cam chamber communicating with the crankcase; and a cylinder head cover attached to the cylinder head to cover the valve operating cam chamber, the cylinder head cover comprising a rib-like wall defining a concave cavity in the cylinder head cover so that an opening side of the concave cavity faces the valve operating cam chamber, wherein a plate member is attached to a free end of the rib-like wall to close the concave cavity to thereby define the gas-liquid separation chamber. The second port can be conveniently formed in the plate member. Such a configuration can provide a compact and easily assembled gas-liquid separation device.

The plate member may preferably extend substantially vertically in an operating state of the internal combustion engine, in that the second port is provided in a lower part of said plate member and said reed valve member is adapted such that its lower portion can flexibly move to be detached from/contact the valve seat. Such a configuration can desirably facilitate accumulation of the oil separated from the blow-by gases in the gas-liquid separation chamber as well as discharge of the accumulated oil from the gas-liquid separation chamber.

The gas-liquid separation device having above configurations may be particularly suitable for a vertical-crankshaft type engine typically used in outboard motors.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
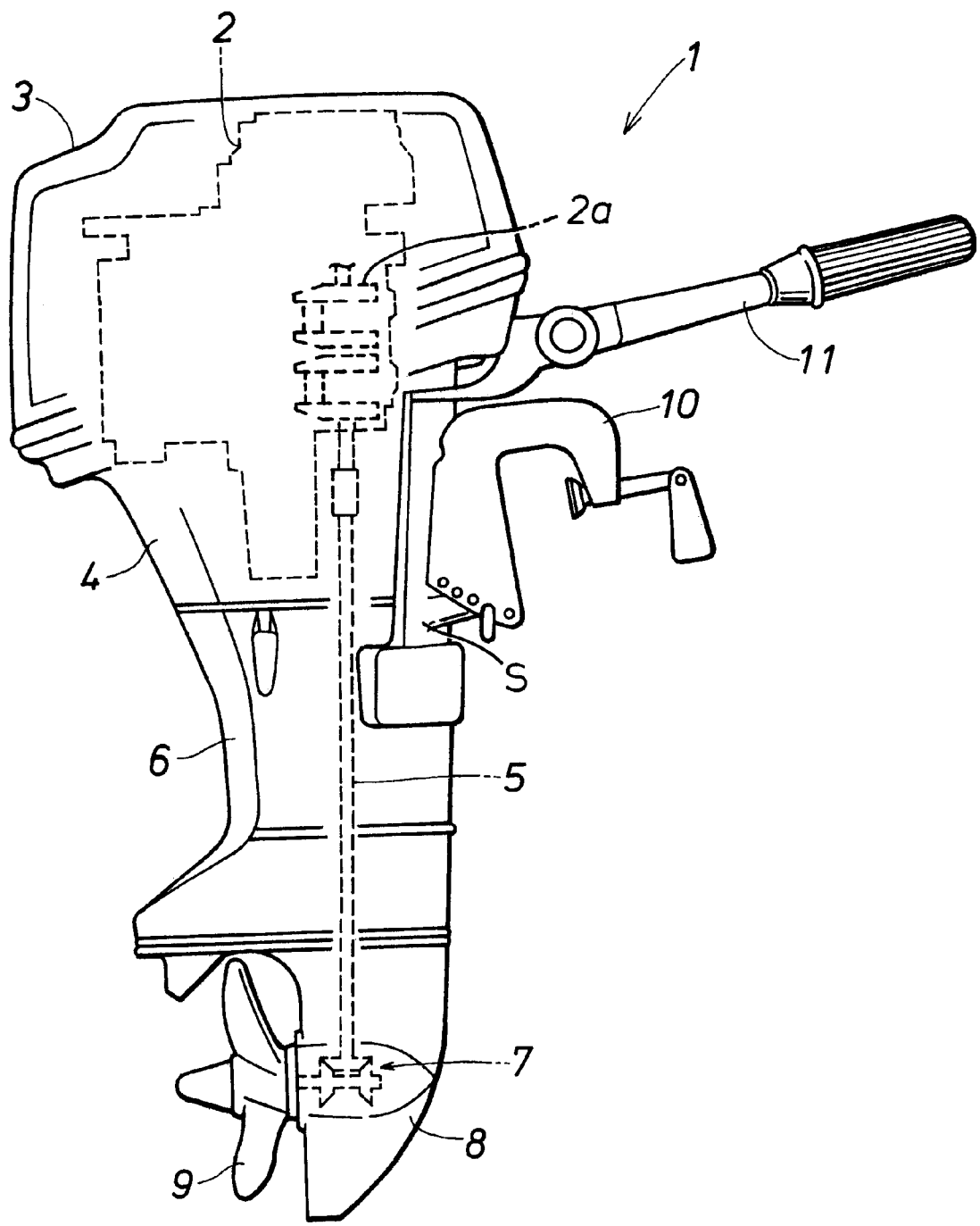
FIG. 1 is an overall side elevational view of an outboard motor comprising an internal combustion engine according to the present invention.

FIG. 1 shows an overall side elevational view of an outboard motor (or outboard marine engine) 1 comprising an internal combustion engine according to the present invention. The outboard motor 1 comprises: an engine cover 3 for covering an internal combustion engine 2; an under cover 4 accommodating an oil pan and a mount portion of the engine; an extension case 6 through which a drive shaft 5 extends; and a gear case 8 accommodating a transmission unit 7 having transmission gears, clutch and forward/reverse switching device or the like. Further, a propeller 9 for generating a thrust force is disposed beside the gear case 8 so as to be engageable with the drive shaft 5 via the transmission unit 7. A vise-type stern bracket 10 is provided for securely attaching the outboard motor 1 to a transom of a boat not shown in the drawing.

The stern bracket 10 and the extension case 6 are connected to each other via a swivel case S containing a vertical swivel shaft so that the extension case 6 can swing laterally around the swivel shaft. This can allow a user to change an angle of the outboard motor 1 with respect to the boat body by operating a steering arm 11 to thereby control the traveling direction of the boat.

Figure 2:
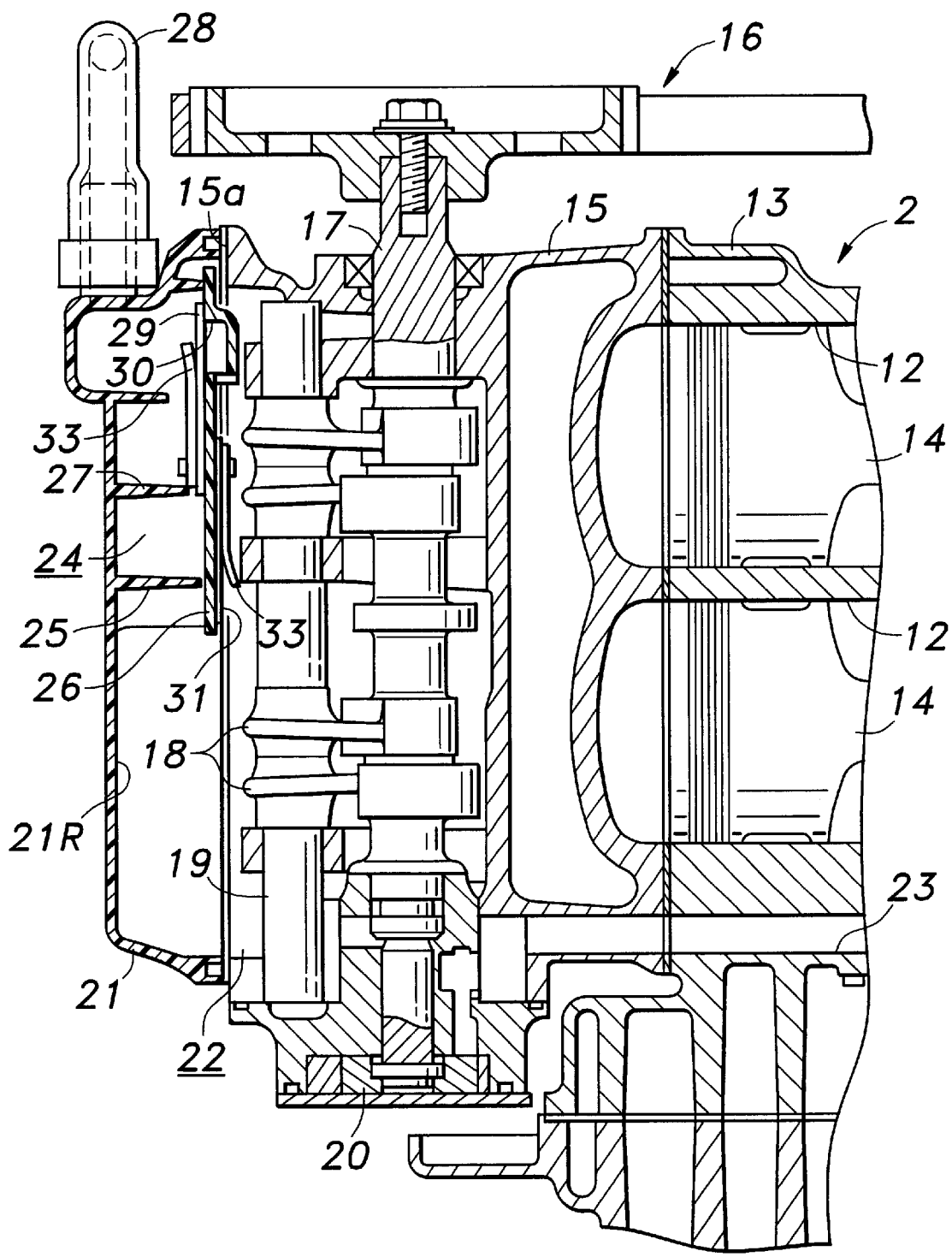
FIG. 2 is an enlarged partial longitudinal cross-sectional view of an internal combustion engine according to the present invention.

As shown in FIG. 2, the engine 2 mounted to the outboard motor 1 can preferably consist of a four-cycle, two-cylinder engine having two horizontal cylinders 12 that are disposed one over the other in a cylinder block 13. Similarly to the conventional engines, each of the two cylinders 12 receives a piston 14 connected to a crankshaft 2a (see FIG. 1). The crankshaft 2a extends in a substantially vertical direction to be operatively connected to the drive shaft 5.

Provided in a cylinder head 15 are a cam shaft 17 operatively connected to the crankshaft 2a via a belt/pulley mechanism 16, and a rocker shaft 19 for supporting rocker arms 18 engaged with the cam shaft 17 to drive intake and exhaust valves. Further, an oil pump 20 is connected to the lower end of the cam shaft 17 to pressurize and deliver the lubricating oil to various parts of the engine.

A rear opening 15a of the cylinder head 15 is closed by a cylinder head cover 21 to define a valve operating cam chamber 22 in that the cam shaft 17, rocker arms 18 and rocker shaft 19 are accommodated. The valve operating cam chamber 22 is in flow communication with a crankcase (not shown in the drawing) via a crankcase ventilation passage 23 extending through the cylinder head 15 and the cylinder block 13.

The head cover 21 may be made of a synthetic resin material such that it assumes a generally box-like shape having an open front side and a closed rear side. More specifically, the head cover 21 comprises a rear wall 21R, from an inner surface of which a rib-like outer wall 25 projects upright (or in a horizontal direction in FIG. 2) so that the outer wall 25 defines a gas-liquid separation chamber 24 in cooperation with a plate member 26 welded to a free end (or front end) of the outer wall 25. As shown, the plate 26 is disposed substantially in parallel with the rear wall 21R of the head cover 21.

Inside the gas-liquid separation chamber 24, rib-like partition walls 27 project from the rear wall 21R to form a labyrinth-like tortuous passage for creating twists and turns in the flow of blow-by gases to thereby expedite separation and removal of the oil mist from the blow-by gases. Further, at a top portion of the outer wall 25 defining the gas-liquid separation chamber 24 is provided a port to which a rubber tube 28 is connected for directing the blow-by gases to an intake passage not shown in the drawing.

Figure 3:
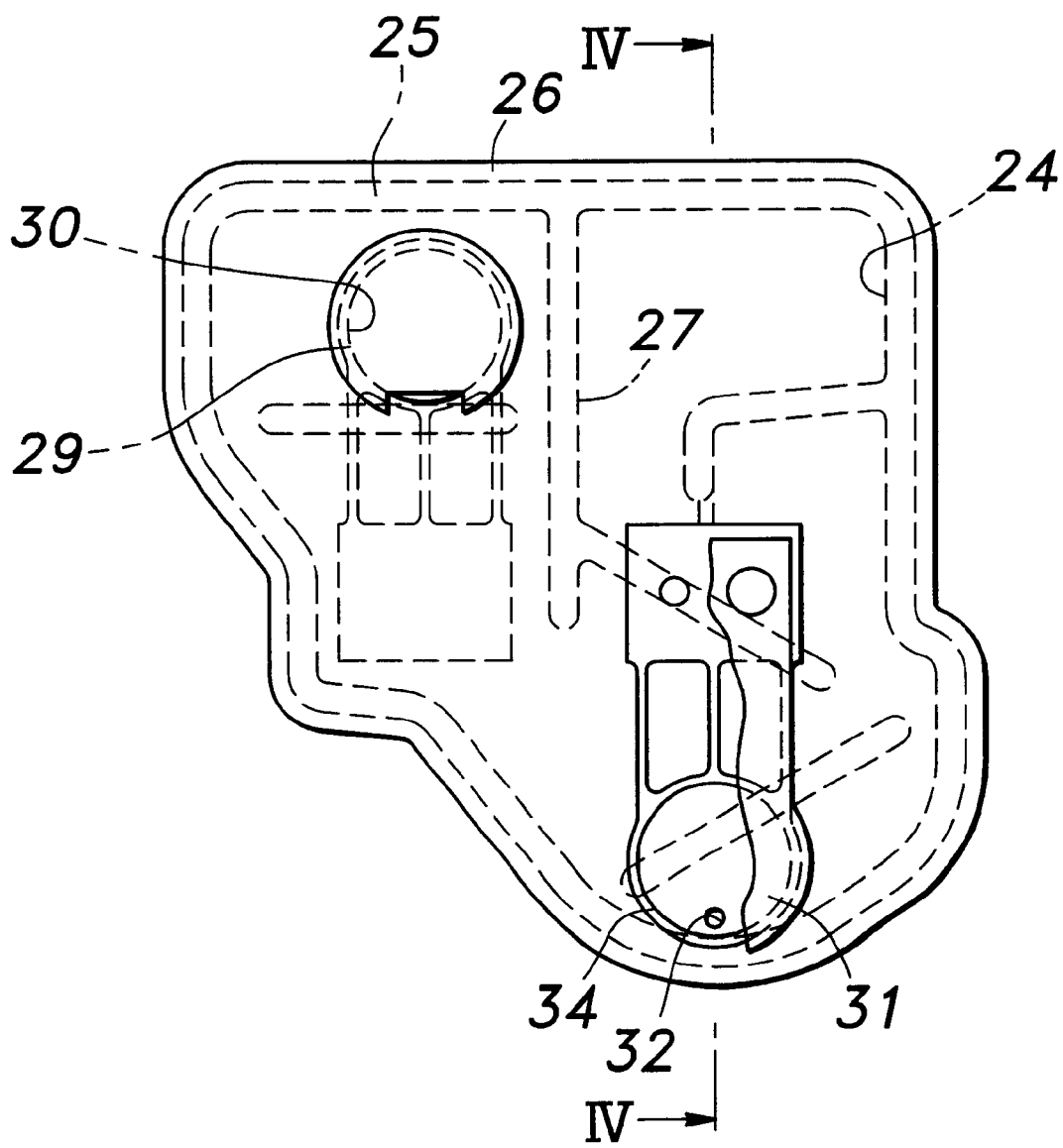
FIG. 3 is a frontal view of a plate member for defining a gas-liquid separation chamber.

Referring also to FIG. 3, the plate 26 forming a front wall of the gas-liquid separation chamber 24 is provided with an inlet port 30 for admitting the blow-by gases from the crankcase into the gas-liquid separation chamber 24 and an outlet port 32 for allowing the oil separated from the blow-by gases to be discharged from the gas-liquid separation chamber 24. The inlet port 30 is provided with a first reed valve member 29 consisting of a flexible plate member to form an inlet one-way valve adapted to open when the pressure inside the valve operating cam chamber 22 is greater than the pressure inside the gas-liquid separation chamber 24. The outlet port 32 is provided with a second reed valve member 31 to form an outlet one-way valve adapted to open when the pressure inside the valve operating cam chamber 22 is lower than the pressure inside the gas-liquid separation chamber 24. It should be appreciated that the pressure increase in the valve operating cam chamber 22 may be caused by an increase in the blow-by gas pressure and/or by downward movements (rightward in FIG. 2) of the pistons 14, while the decrease in the same may be caused by upward movements (leftward in FIG. 2) of the pistons 14.

The inlet port 30 is positioned in an upper part of the gas-liquid separation chamber 24 while the outlet port 32 is positioned in a lower part of the same.

As best seen in FIG. 2, each of the reed valve members 29, 31 is provided with a backup plate (or stopper plate) 33 for preventing the reed valve members from excessively bending. It should be noted that the compliance of the second reed valve member 31 is preferably adjusted such that the second valve member 31 does not flex to open the valve only with a pressure due to the lubricating oil accumulated in the bottom of the gas-liquid separation chamber 24.

The first reed valve member 29 associated with the inlet port 30 is secured to an inside surface of the plate 26 and adapted to close the port 30 in response to a decrease in the pressure in the valve operating cam chamber 22 to control entry of the oil mist into the gas-liquid separation chamber 24 as well as to ensure that the pressure decrease in the valve operating cam chamber 22 causes the second reed valve member 31 to bend to thereby open the outlet one-way valve.

As best shown in FIG. 3, the inlet port 30 is provided with a relatively large opening area so that the increase in the pressure in the crankcase due to the flow of blow-by gases or downward movements of the pistons 14 can be readily absorbed. On the other hand, the outlet port 32 is provided with a relatively small opening area so that the pressure decrease (or negative pressure) in the crankcase caused by upward movements of the pistons 14 effectively acts on the lubricating oil accumulated in the gas-liquid separation chamber to draw out the lubricating oil by the action of a suction pump.

Figure 4:
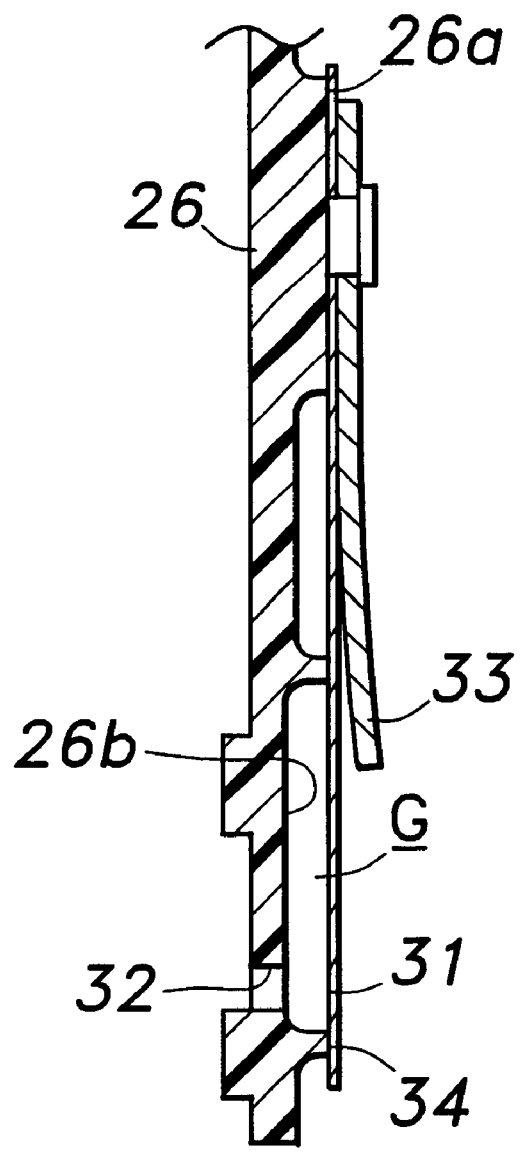
FIG. 4 is a partial cross-sectional view along the line IV—IV in FIG. 3.

As shown in FIG. 4 also, a base portion of the second reed valve member 31 is secured to a plateau-like flat elevated surface 26a of the plate 26 facing the valve operating cam chamber 22, and the outlet port 32 is formed in a lower surface 26b of the plate 26 and encircled by an annular projection 34 extending out from the surface 26b and having a free end aligned with the elevated surface 26a. Thus, in this embodiment, the free end of the projection 34 provides an annular, elevated surface serving as a valve seat for the second reed valve member 31. It should be noted that the annular surface serving as a valve seat defines a substantially larger opening area than the outlet port 32.

In this way, in the valve-closing state, the second reed valve member 31 abuts the free end of the projection 34 to define a proper space (or gap) G between the surface 26b surrounding the outlet port 32 and an inner surface of the second reed valve member 31. This space G having a sufficient volume serves to reduce or dampen the pumping effect caused by the closing action of the second reed valve member 31, thereby preventing the oil accumulated in the outlet port 32 or sticking on the reed valve member itself from being pushed back into the inside of the gas-liquid separation chamber 24.

It should be noted that, as shown, the outlet port 32 is formed in the lower part of the space G and the second reed valve member 31 is adapted such that the lower portion thereof can flexibly move to open/close the outlet one-way valve, facilitating accumulation of the separated oil as well as discharge of the accumulated oil.

As described above, according to the present invention, the elevated valve seat defines a space between the second reed valve member and the wall surface around the outlet port in the valve-closing state, and a volume of the space functions to dampen the air oscillation at the time when the reed valve member moves to close the valve, whereby the pumping effect caused by the closing action of the reed valve member can be significantly reduced. Therefore, the present invention is quite beneficial in improving the return efficiency of the lubricating oil separated in the gas-liquid separation chamber.

Although the present invention has been described in terms of preferred embodiments thereof, it is obvious to a person skilled in the art that various alterations and modifications are possible without departing from the scope of the present invention which is set forth in the appended claims. For example, although in the above embodiment the protrusion 34 for defining a valve seat for the second reed valve member extends out from the wall surface surrounding the outlet port, it may be possible to attach a separate annular member to the wall surface by means of adhesive or the like.

Further, although the annular surface serving as the valve seat for the second reed valve was shown in the above embodiment as having a circular shape, the annular surface may assume any other suitable shape such as square or the like. Such modifications should fall within the scope of the present invention.

What is claimed is:

1. A gas-liquid separation device for an internal combustion engine, comprising:

a gas-liquid separation chamber defined in a part of the engine, the chamber being provided with first and second ports communicating with a crankcase, and a third port communicating with an intake passage, the first port being provided with a first one-way valve for allowing blow-by gas from the crankcase to flow into the chamber, and the second port being provided with a second one-way valve for allowing oil separated from the blow-by gas to be discharged from the chamber, wherein the second one-way valve includes a reed valve member adapted to selectively close the second port, and a valve seat defined by an annular surface which is elevated from a surface of a wall surrounding the second port and defines a larger opening area than the second port.

2. A gas-liquid separation device according to claim 1, wherein said annular surface comprises a free end of an annular protrusion extending out from the surface of the wall surrounding the second port.

3. A gas-liquid separation device according to claim 2, wherein the wall comprises an elevated surface substantially aligned with the valve seat, and a base portion of the reed valve member is secured to the elevated surface.

4. A gas-liquid separation device according to claim 3, wherein the internal combustion engine comprises:

a cylinder head defining therein a valve operating cam chamber communicating with the crankcase; and a cylinder head cover attached to the cylinder head to cover the valve operating cam chamber, the cylinder head cover comprising a rib-like wall defining a concave cavity in the cylinder head cover so that an opening side of the concave cavity faces the valve operating cam chamber, wherein a plate member is attached to a free end of the rib-like wall of the cylinder head cover to close the concave cavity to thereby define the gas-liquid separation chamber.

5. A gas-liquid separation device according to claim 4, wherein the second port is formed in the plate member.

6. A gas-liquid separation device according to claim 5, wherein the plate member extends substantially vertically in an operating state of the internal combustion engine, and wherein the second port is provided in a lower part of said plate member and said reed valve member is adapted such that its lower portion can flexibly move to be detached from/contact the valve seat.

7. A gas-liquid separation device according to claim 1, wherein said internal combustion engine is used in an outboard motor.

* * * * *